United States Patent [19]

Salomon

[11] Patent Number: 5,280,560
[45] Date of Patent: Jan. 18, 1994

[54] ELECTRIC COFFEE MAKER WITH WATER HEATER AND ELECTRICAL COMPONENTS EASILY AUTOMATICALLY ASSEMBLED INTO A BASE SHELL

[75] Inventor: Thomas Salomon, Schloss Holte, Fed. Rep. of Germany

[73] Assignee: Melitta Haushaltsprodukte GmbH & Co. KG, Minden, Fed. Rep. of Germany

[21] Appl. No.: 833,716

[22] Filed: Feb. 11, 1992

[30] Foreign Application Priority Data

Feb. 15, 1991 [DE] Fed. Rep. of Germany ....... 4104652

[51] Int. Cl.⁵ .......................... H05B 3/00; F24H 1/14; A47J 31/56
[52] U.S. Cl. ........................................ 392/467; 99/281; 99/288; 99/300; 99/306; 392/480; 392/484
[58] Field of Search ............... 99/279, 281, 282, 306–310, 300; 392/467, 480, 484

[56] References Cited

U.S. PATENT DOCUMENTS 4,748,901 6/1988 Burmeister .......................... 99/306

FOREIGN PATENT DOCUMENTS

| 330232 | 8/1989 | European Pat. Off. ............ 392/467 |
| 3811589 | 3/1989 | Fed. Rep. of Germany . |
| 3904377 | 8/1990 | Fed. Rep. of Germany ........ 99/300 |
| 3904378 | 8/1990 | Fed. Rep. of Germany . |
| 2113813 | 8/1983 | United Kingdom ................ 392/467 |

Primary Examiner—Anthony Bartis
Attorney, Agent, or Firm—Spencer, Frank & Schneider

[57] ABSTRACT

A coffee or tea maker includes a base shell including a vertically-oriented connecting sleeve; a flow heater accommodated in the base shell and having a vertically-oriented inlet nipple received in the connecting sleeve; a mains cable connection situated in the base shell; a machine switch situated in the base shell; an electric circuit board connected to the mains cable connection and to the machine switch and having plug-in pins; and a bottom closing off the base shell and locked thereto by a detent joint. All the plug-in and detent connections define a vertical joining direction for relative movement toward one another into a locked state during an assembling operation.

19 Claims, 2 Drawing Sheets

ELECTRIC COFFEE MAKER WITH WATER HEATER AND ELECTRICAL COMPONENTS EASILY AUTOMATICALLY ASSEMBLED INTO A BASE SHELL

BACKGROUND OF THE INVENTION

This invention relates to a coffee or tea maker including a base accommodating a flow heater and possibly a warming plate.

In the manufacture of conventional coffee or tea makers of the above-outlined type—which also includes an electrical system—technical difficulties have been encountered particularly in the assembly operation. Automatic assembly is possible only—if at all—with a highly complicated and expensive assembly system. Import regulations of certain countries, requiring a special, flame-proof accommodation of the electrical system, add to the manufacturing problems. Although such an accommodation of the electrical system can be effected in principle by the use of flame-proof plastics in the housing region, particularly since relatively inexpensive plastics available for construction of the housing can be made flame-proof by appropriate additives, such flame-proof plastics are physiologically not entirely acceptable, precisely because of the use of these additives. Consequently, in such a case it is appropriate to ensure that the water and the coffee or tea will not come in contact with such plastics under any circumstances.

SUMMARY OF THE INVENTION

It is an object of the invention to provide an improved coffee or tea maker which is particularly suitable for simplified automatic assembly, taking into account, if necessary, the above-outlined flame-proofing problems.

This object and others to become apparent as the specification progresses, are accomplished by the invention, according to which, briefly stated, the coffee or tea maker includes a base shell including a vertically-oriented connecting sleeve; a flow heater accommodated in the base shell and having a vertically-oriented inlet nipple received in the connecting sleeve; a mains cable connection situated in the base shell; a machine switch situated in the base shell; an electric circuit board connected to the mains cable connection and to the machine switch and having plug-in pins; and a bottom closing off the base shell and locked thereto by a detent joint. All the plug-in and detent connections define a vertical joining direction for relative movement toward one another into a locked state during an assembling operation.

It is an important feature of the invention that by virtue of the above-outlined structure, the entire electrical system of the machine, particularly the flow heater and its heating element as well as the respective terminals, the circuit board comprising a stamped-out conductor pattern and its connections for the main switch of the device and the mains cable, the connector of the mains cable itself as well as the electrical components of the main switch of the device are all accommodated in the base. If required, it is thus also possible to easily produce the base shell and the base bottom of a flame-proof plastic so that the entire electrical system is encased in a flame-proof plastic to meet the requirements, while all other components of the machine may be made of other materials, particularly materials that are not flame-proof. Thus, these components, which come in contact with water or with coffee or tea, meet the physiological requirements. The transition regions are formed essentially by the connecting zones between, on the one hand, the flow heater and the water vessel and, on the other hand, between the flow heater and the riser pipe leading to the brewing device. Appropriate seals have to be provided in the zones between different materials.

The coffee or tea maker according to the invention is eminently well suited for automatic assembly since all significant couplings between the above-outlined components can be performed in one and the same joining direction which permits working with a relatively simple assembly system. It is to be stressed that considering the relatively complex configuration of such a machine, the automatic assembly of components and component groups with one another requires a "fixed point" having the least possible tolerance and to which the assembling and joining movements can be related.

According to the invention, such "fixed point" is formed by the connecting sleeve which forms part of the base shell and which receives the inlet member of the flow heater and on which, at a later point in time during assembly, the outlet nipple of the water vessel is installed. Since the base shell and the connecting sleeve are plastic components that must be manufactured true to dimensions and which in essence constitute the base element for the entire subsequent assembly work, this "fixed point" required for automatic assembly is predetermined with good accuracy. The preferably plastic-encased warming plate can then be inserted in a precise fit, in a vertical insertion movement, into the base shell which may also be of a flame-proof plastic. Particularly in a flame-proof construction, it is expedient to insert a seal into the connecting sleeve of the base shell to seal against the vertical inlet member of the flow heater. This seal also acts relative to the connecting pipe of the water vessel and thus ensures a fluidtight transfer of the water into the flow heater in a physiologically acceptable manner. The connecting sleeve of the base shell which is vertically oriented to correspond to the inlet member of the flow heater, may be provided with the sealing element in the course of a vertical insertion movement. The flow heater too, can be placed into the base shell in the course of a vertical insertion movement and can be connected to the warming plate, if such a component is provided. The circuit board can also be inserted in a vertical insertion movement and, since all connections are oriented in the vertical joining direction, it may be at the same time mechanically locked to the base and connected by way of correspondingly-oriented electrical plug-in connections with the electrical system of the heating element of the flow heater.

According to a particularly advantageous embodiment of the invention, the circuit board is connected with a tensioning wire which is grounded in the circuit board. During the joining movement, the flow heater is engaged by the tensioning wire to maintain the flow heater pressed against the base shell or against the warming plate (if present) under the tension provided by the tensioning wire and to simultaneously connect it to ground. In this manner the assembly process can thus be further simplified. The circuit board carries the terminals for a main switch and a mains cable, and the terminals are plug-in connectors. Therefore, the main switch and the mains cable can be easily added. Again, in a simple vertical joining movement, the bottom of the base, which may also be composed, if required, of a flame-proof plastic, can then be added as the final phase of the base assembly and can be mechanically locked to the base shell.

According to a particularly advantageous feature of the invention, the bottom of the base is provided with ribs which are arranged in such a manner that they block the previously established connection between the circuit board and the base shell.

Based on the described construction, maintenance and repair work can be readily performed. By releasing the detent connections in the correct sequence and removing the components in the reverse order compared to their insertion, any defective location can be easily reached. Advantageously no electrical wires need to be loosened and reconnected later.

Upon performing the above-described assembly steps in the region of the base, the entire electrical system of the machine is assembled and ready to operate. Thus, all monitoring work can be performed in this phase and, if necessary, exchanges or repairs can be made with insubstantial disassembly work. Also, seal tests can be made in the region of the flow heater connections.

DESCRIPTION OF THE PREFERRED EMBODIMENT

Figure 1:
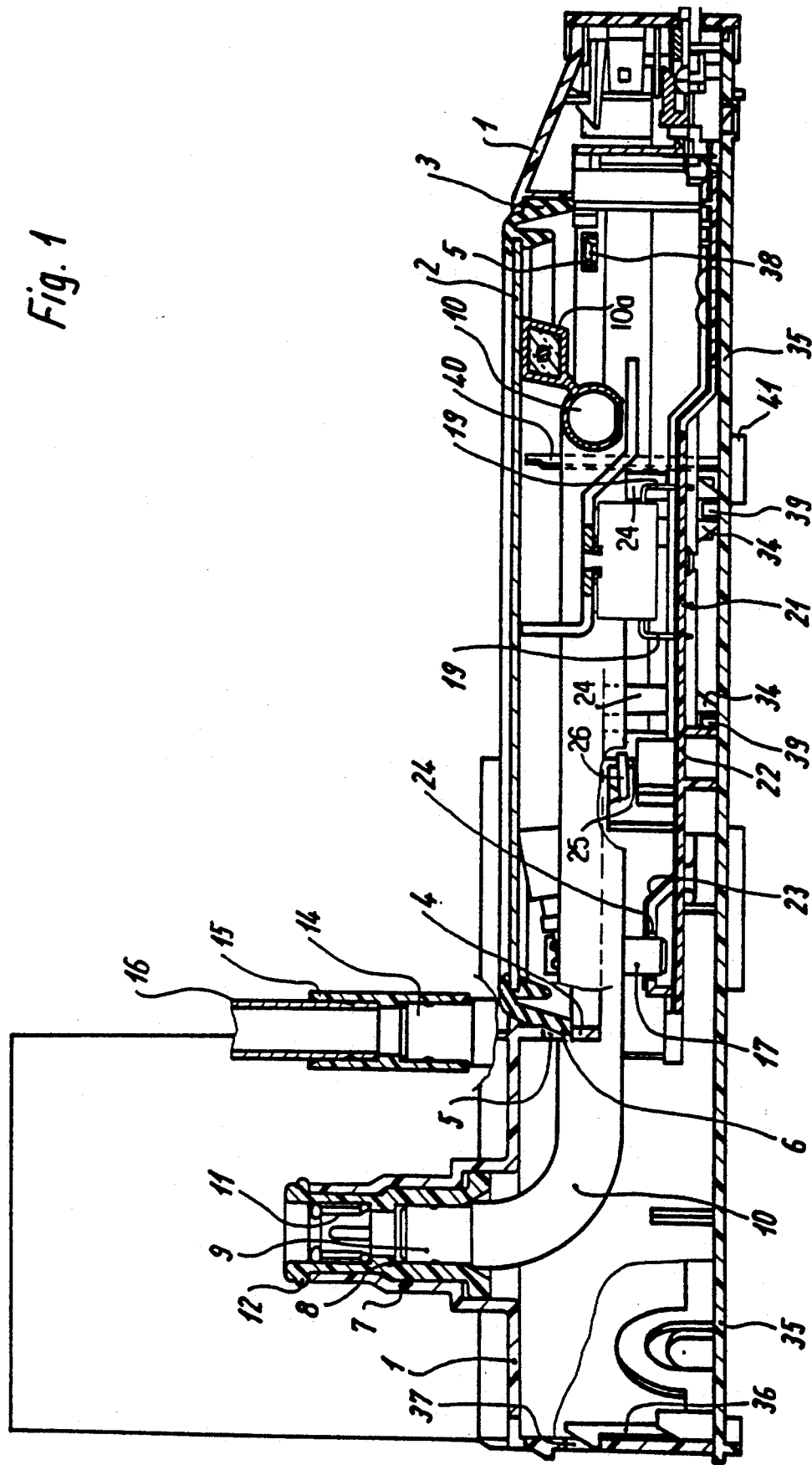
FIG. 1 is a sectional side elevational view of a base of a coffee or tea maker according to a preferred embodiment of the invention, taken along line I—I of FIG. 2.
Figure 2:
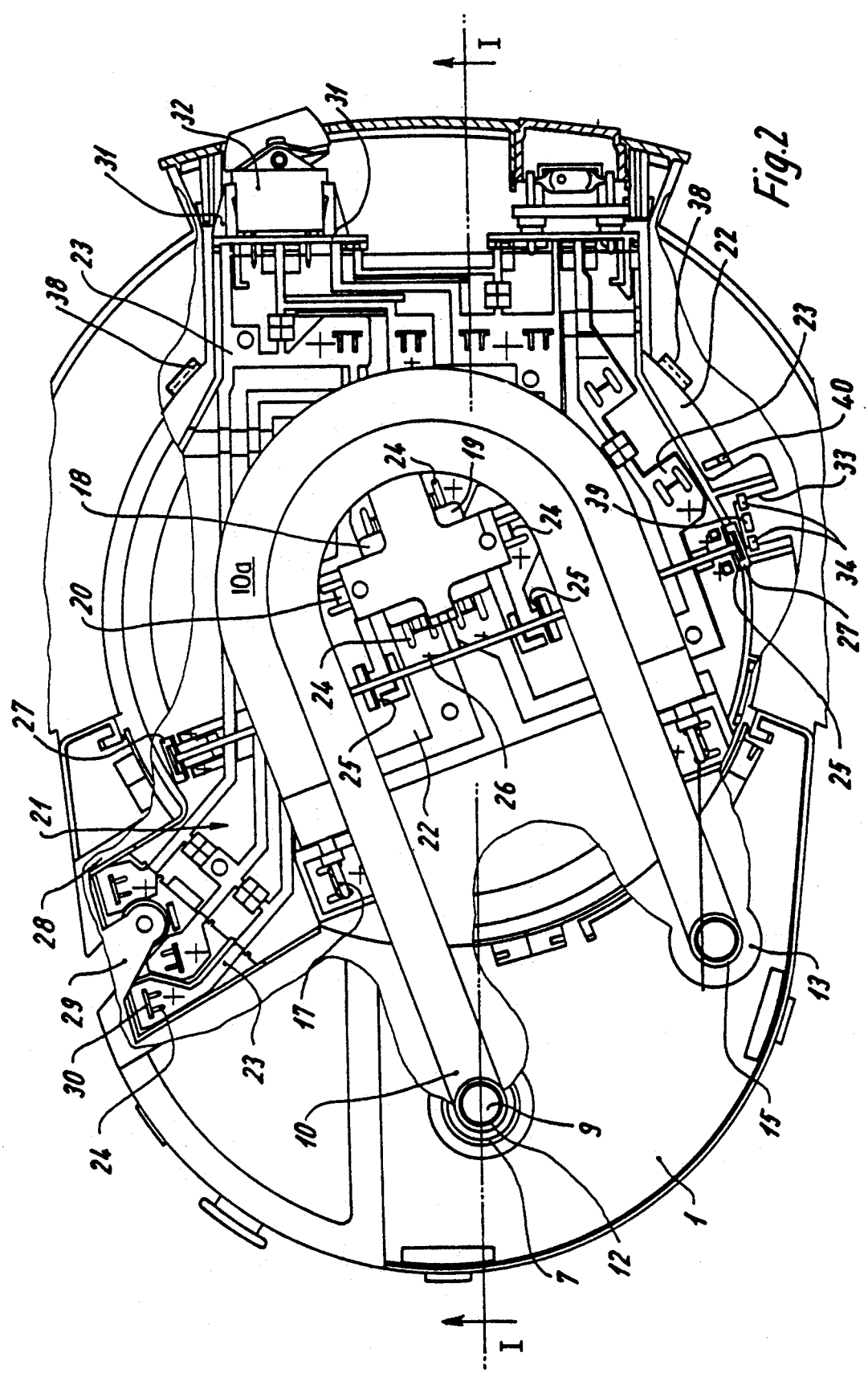
FIG. 2 is a top plan view of the structure shown in FIG. 1, with some components removed for the sake of clarity.

The coffee or tea maker shown in FIGS. 1 and 2 includes a base composed of a base shell 1 made of plastic which may be flame-proofed, if required. A warming plate 2 which may be of aluminum, is inserted into the base shell 1. During the brewing process, a pitcher or the like receiving the brewed beverage is placed onto the warming plate 2. In other designs, for example, where a warming device is integrated in the bottom of the pitcher itself, the base shell may be continuous in this region and then form merely a support base for the pitcher.

The preferably circular warming plate 2 is surrounded by a continuous profiled seal 3 which may be sprayed on the periphery of the warming plate 2. An inwardly projecting ring 4 is formed at the base shell 1 into which the seal 3 can be inserted. The wall of ring 4 may be provided, for example, with a plurality of window-like passages 5 for anchoring the seal 3. For this purpose, detent nubs 6 are provided on the exterior of the seal 3 so as to enter into passages 5 at appropriate locations. The arrangement is such that, with the base shell 1 in the inverted, upwardly open position, the warming plate 2 and the seal 3 can be inserted and fixed in the base shell 1 in a vertical joining movement.

The base shell 1 further includes a connecting sleeve 7 which, in the operational position, projects vertically upwardly and into which there is inserted a sleeve-like (tubular) sealing element 8 of a physiologically acceptable material, for example, silicone. The sealing element 8, when installed, accommodates in a precise fit a vertical inlet member 9 of a flow heater 10 to be positioned in the base. During the automatic assembly of the machine base and the complete electrical system to be accommodated therein, the connecting sleeve 7 serves, as will be described in greater detail below, as a fixed support constituting a reference to which the entire assembly process is related.

A check valve 11, as it is customarily provided between the flow heater and the fresh water reservoir of the beverage maker is disposed in the sealing element 8. The latter is provided with a circumferential sealing bead 12 which projects upward and outward beyond the connecting sleeve 7 and, in the completely assembled state of the machine, cooperates with the connecting pipe (not shown) which leads from the water reservoir and which is to be inserted onto the exterior of the connecting sleeve 7.

The base shell i further includes an aperture 13 through which a vertical outlet member 14 of the flow heater 10 is pushed during the assembly. Before being fixed, the flow heater 10 thus has a small degree of freedom of rotary motion in the connecting sleeve 7. This arrangement including the aperture 13 may be regarded as a loose support appropriate for the assembly process with respect to manufacturing tolerances that have to be compensated. The outlet member 14 has a connecting portion 15 that serves as a seal and is expediently made of a physiologically acceptable material such as silicone for subsequently receiving the riser pipe 16 leading to the brewing device of the machine.

The connecting sleeve 7, the sealing element 8, and the flow heater 10, together with the vertical inlet and outlet members 9 and 14 have a uniform, vertical joining direction relative to one another.

For the energy supply and control of the flow heater 10, the latter has supply, control, fuse and ground terminals, constituted by plug-in connector elements. For the current supply, vertically oriented plug-in pins 17 are provided at both ends of the heating tube 10a of the flow heater 10. Moreover, there are provided plug-in pins 18 for connecting a fuse, plug-in pins 19 for the control circuit and plug-in pins 20 for the ground connection. All plug-in pins are oriented vertically.

Further, the base shell 1 accommodates an electrical circuit board 21 which is formed of a plastic carrier plate 22 provided with a stamped conductor pattern which has various contact slots 24 at appropriate locations so as to cooperate with the plug-in pins 17 to 20 of the flow heater, to electrically connect the flow heater 10 with the circuit board 21 in a single vertical joining movement.

The stamped conductor assembly 23 further includes vertically oriented plug-in pins 25 into which a tensioning wire 26—which straddles the circuit board 21—is inserted in a contacting manner. Stops 27 formed on the plastic carrier plate 22 prevent the wire 26 from being displaced. The tensioning wire 26 is positioned by the plug-in pins 25 in such a spatial relationship that during assembly its own tension causes it to press against the flow heater 10 and, in the illustrated embodiment, urge it against the underside of the warming plate 2. The metal body of the flow heater 10 as a whole can be connected to ground directly by way of the tensioning wire 26 and the plug-in pins 25.

A receptacle 28 for a mains cable connector 29 is further formed on the plastic carrier plate 22 of the electrical circuit board 21. The connector 29 in turn is provided with vertically oriented plug-in pins 30 which can be inserted into corresponding contact slots 24 in the conductor assembly 23 by way of a vertical joining movement.

The electrical circuit board 21 further includes a mechanical/electrical coupler 31 for the main switch 32. Since the main switch is pre-assembled together with the circuit board before the latter is inserted into the base, a vertically oriented joining direction is, in this instance, not a requirement.

The electrical circuit board 21 whose outline has the approximate shape of a circle segment is provided in the outer edge region of plastic carrier 22 with a plurality of recesses 33 which are distributed over its circumference and which serve to attach the circuit board 21 to the base shell 1. At corresponding locations, the underside of ring 4 of the base shell 1 is provided with pairs of projecting detent hooks 34 which are vertically oriented and, with the appropriate joining movement, are able to snap over the lateral outer wall regions of the recesses 33 of the plastic carrier 22 of the circuit board 21. The detent hooks 34 of a pair are at a distance from one another to thus form a space between them whose significance will be described in greater detail below.

A bottom plate 35 is securable to the base shell 1 and may be of a flame-proof plastic, if required. The bottom plate 35 is provided with a plurality of projecting detent hooks 36 that are distributed over its outer circumference and for which detent openings 37 are provided at corresponding locations on the outer wall of the base shell 1. The bottom plate 35 also includes projecting, further inwardly disposed detent hooks 38 for engaging in some of the apertures 5 provided in the ring 4 of the base shell 1. The detent hooks 36 and 38 are Orient vertical joining direction. Additionally, the bottom plate 35 is provided with upwardly projecting ribs 39 which are arranged in such a manner that, after assembly, they enter into the spaces between each pair of detent hooks 34 which, from the direction of the ring 4 of the base shell 1, are in a locking engagement with the recesses 33 in the plastic carrier 22 of the circuit board. Thus, in the engaged position, the detent lock is reliably blocked by the projecting ribs 39.

Further, at bottom plate 35 two spaced facing supporting ribs 40 are provided which project upwardly to such an extent that, in the assembled state, they engage the seal 3 at the underside of the warming plate 2. Any mechanical forces exerted from above to the warming plate 2 due to handling of the pitcher are thus transferred through supporting ribs 40 directly to the bottom plate 35. The underside of the latter is expediently provided with small pads or feet 41 which are arranged directly underneath the interior supporting ribs 40.

In the description which follows, the automatic assembly of the above-described essential elements of the base region of the machine will be set forth.

The base shell 1 is inverted and immobilized in the assembling apparatus, so that the connecting sleeve 7 points downwardly. In a vertical joining movement, the sleeve-shaped sealing element 8 is inserted into the connecting sleeve 7. Then, with a vertical joining movement, the flow heater 10 is introduced, and its vertical inlet member 9 is inserted into the sealing element 8, and its vertical outlet member 14 is passed through the aperture 13. Thereafter, in a vertical joining movement, the electrical circuit board 21 is inserted which had previously been provided with the main switch 32. An earlier installation of the tensioning wire 26 is feasible, although the procedure may also be such that the tensioning wire 26 is placed onto the flow heater 10 and in the course of the joining movement for the circuit board 21 the wire enters into the plug-in pin 25. The mains cable connection 29 may also be pre-assembled, or it may be separately inserted into the circuit board 21 in a further vertical joining movement after the insertion of the circuit board 21. During the vertical joining movement, the plug-in pins 17 to 20 of the electrical system of the flow heater 10 pass through the corresponding contact slots 24 of the conductor assembly 23 of the circuit board 21. Additionally, during this joining movement, the detent hook pairs 34 in the ring 4 of the base shell 1 engage in the recesses 33 of the plastic carrier 22 of the circuit board 21. After this joining process, the circuit board is locked to the base shell 1 and, by way of the tensioning wire 26, holds the flow heater 10 in the correct position against the warming plate 2. Finally, in a vertical joining movement, the bottom plate 35 is introduced, with its detent hooks 36 and 38 engaging in the corresponding passages in the base shell 1. The supporting ribs 40 become positioned underneath the seal 3 of the warming plate 2 and the projecting ribs 39 enter between the detent hooks of detent hook pairs 34 to block the latter in their interlocking position with the circuit board.

It will be understood that the above description of the present invention is susceptible to various modifications, changes and adaptations, and the same are intended to be comprehended within the meaning and range of equivalents of the appended claims.

What is claimed is:
1. In a coffee or tea maker comprising
   (a) a base shell having an upright orientation during service; said base shell including an open bottom and a vertically-oriented connecting sleeve;
   (b) a tubular sealing element disposed in said connecting sleeve;
   (c) an electrically heated flow heater accommodated within said base shell and having a vertically-oriented inlet nipple received in said tubular sealing element; said vertically-oriented inlet nipple and said connecting sleeve defining a vertical joining direction for relative movement toward one another into a joined state during an assembling operation of said flow heater into said shell through said open bottom thereof; said flow heater further having vertical electric terminals;
   (d) a mains cable connection situated in said base shell;
   (e) a machine switch situated in said base shell;
   (f) an electric circuit board connected to said mains cable connection and to said machine switch; said electric terminals of said flow heater and said electric circuit board defining a vertical joining direction for relative movement toward one another into a joined state during an assembling operation of said circuit board into said shell through said open bottom thereof; said electric circuit board having vertical plug-in pins; said plug-in pins and said base shell defining a vertical joining direction for relative movement toward one another into a joined state during an assembling operation of said circuit board into said shell through said open bottom thereof; and
   (g) a bottom plate closing off said open bottom of said base shell and being locked thereto by a detent joint having a vertical orientation; said bottom plate and said base shell defining a vertical joining direction for relative movement toward one another into a locked state during an assembling oper- ation of said bottom plate onto said shell to close said open bottom thereof.

2. A coffee or tea maker as defined in claim 1, wherein said base shell is of flame-proofed plastic.

3. A coffee or tea maker as defined in claim 1, wherein said electric circuit board includes a stamped-out conductor pattern assembly including plug-in slots receiving the electric terminals of said flow heater; said electric terminals of said flow heater and said conductor pattern assembly define a vertical joining direction for relative movement toward one another into a joined state during an assembling operation of said circuit board with said flow heater.

4. A coffee or tea maker as defined in claim 1, further comprising a tensioning wire situated on said electric circuit board; said tensioning wire having a portion cooperating with the base shell for urging said flow heater against said base shell.

5. A coffee or tea maker as defined in claim 4, wherein said tensioning wire is grounded on said electric circuit board.

6. A coffee or tea maker as defined in claim 1, further comprising plug-in slots provided in said electric circuit board; and vertically-oriented plug-in pins provided on said mains cable connection; said plug-in pins of said mains cable connection being received by said plug-in slots in said electric circuit board when the circuit board is assembled into the shell.

7. A coffee or tea maker as defined in claim 1, wherein said base shell has an aperture; further wherein said flow heater has a vertically-oriented outlet nipple traversing said aperture in said base shell with a play.

8. A coffee or tea maker as defined in claim 1, further comprising adjoining plug-in detent connections between said electric circuit board and said base shell.

9. A coffee or tea maker as defined in claim 8, further wherein said bottom plate is provided with ribs projecting into said base shell between said adjoining plug-in detent connections for blocking said plug-in detent connections.

10. A coffee or tea maker as defined in claim 1, further wherein said tubular sealing element has an external circumferential sealing bead for cooperating with a water vessel outlet nipple.

11. A coffee or tea maker as defined in claim 1, further comprising a check valve disposed in said tubular sealing element.

12. A coffee or tea maker as defined in claim 1, further comprising a warming plate accommodated in said base shell and means are provided for holding said flow heater against said base shell.

13. A coffee or tea maker as defined in claim 12, further comprising a tensioning wire situated on said electric circuit board; said tensioning wire having a portion cooperating with the circuit board for urging said flow heater against said warming plate.

14. A coffee or tea maker as defined in claim 12, further comprising support ribs formed on said bottom plate; said support ribs extending into said base shell and engaging said warming plate.

15. A coffee or tea maker as defined in claim 12, further comprising a contoured seal extending peripherally along said warming plate and said base shell.

16. A coffee or tea maker as defined in claim 15, further comprising support ribs formed on said bottom; said support ribs extending into said base shell and engaging said contoured seal.

17. A coffee or tea maker as defined in claim 16, wherein said bottom has external feet situated underneath said support ribs.

18. A coffee or tea maker as defined in claim 15, wherein said base shell includes a circumferential annular wall provided with apertures; said warming plate and said contoured seal being surrounded by said circumferential annular wall; said contoured seal having nubs projecting into some of said apertures for forming a detent lock.

19. A coffee or tea maker as defined in claim 18, further comprising detent hooks formed on said bottom; said detent hooks extending into some of said apertures of said circumferential annular wall.

* * * * *